(12) United States Patent
Yim et al.

(10) Patent No.: US 8,262,001 B2
(45) Date of Patent: Sep. 11, 2012

(54) METHOD FOR PHYSICALLY MARKING OBJECTS USING CONTINUOUS FUNCTIONS

(75) Inventors: Raymond Yim, Cambridge, MA (US); Philip Orlik, Cambridge, MA (US); Dirk Brinkman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 12/982,522

(22) Filed: Dec. 30, 2010

(65) Prior Publication Data

US 2012/0168523 A1 Jul. 5, 2012

(51) Int. Cl.
*G06K 19/05* (2006.01)
(52) U.S. Cl. ............... 235/494; 235/454; 235/462.11
(58) Field of Classification Search ............ 235/494, 235/454, 462.1, 462.11
See application file for complete search history.

(56) References Cited

U.S. PATENT DOCUMENTS

| | | | |
|---|---|---|---|
| 5,153,418 A | 10/1992 | Batterman | |
| 5,189,292 A | 2/1993 | Batterman | |
| 5,223,701 A | 6/1993 | Batterman | |
| 5,245,165 A | 9/1993 | Zhang | |
| 6,556,961 B1 * | 4/2003 | Lafe | 703/2 |
| 7,059,527 B2 * | 6/2006 | Mergenthaler et al. | 235/462.25 |
| 7,131,002 B2 * | 10/2006 | Yoshizawa | 713/168 |
| 7,796,898 B2 | 9/2010 | Armstrong | |
| 2007/0002946 A1 * | 1/2007 | Bouton et al. | 375/240.01 |
| 2007/0194118 A1 * | 8/2007 | Powell et al. | 235/454 |
| 2010/0327064 A1 | 12/2010 | Yim | |
| 2010/0328054 A1 | 12/2010 | Yim | |

* cited by examiner

*Primary Examiner* — Daniel St.Cyr
(74) *Attorney, Agent, or Firm* — Dirk Brinkman; Gene Vinokur

(57) ABSTRACT

A set of symbols is encoded using a continuous mapping function to produce corresponding encoded functions, wherein the mapping function is continuous and values of the encoded functions are real and vary continuously. The encoded functions are summed in a spatial domain to generate a summed function, which is biased so that values of a biased function are all positive and real. Then, a physical property of the object is altered according the biased function to arrange a mark on the object.

36 Claims, 15 Drawing Sheets

METHOD FOR PHYSICALLY MARKING OBJECTS USING CONTINUOUS FUNCTIONS

FIELD OF THE INVENTION

This invention relates generally to marking objects, and more particular to marking the objects with marks generated by continuous functions.

BACKGROUND OF THE INVENTION

A number of techniques are known for marking objects, e.g., linear barcodes and matrix codes such as a QR code. Most conventional marking schemes use unique and discrete number of observable symbols to encode information. For example, an information bit "0" is represented by a black patch, and an information "1" is represented by a white patch. Sometimes, a symbol can represent multiple bits of information, such as done for an optical orthogonal code, see U.S. application Ser. No. 12/640,949. Marks can also be used on road surfaces, see U.S. application Ser. No. 12/495,419.

Some marks have the property that enables sensors with different resolutions to decode different amount of information, e.g., DataGlyphs in U.S. Pat. No. 5,245,165, and Mini-Code in U.S. Pat. Nos. 5,153,418, 5,189,292, and 5,223,701. However, the sensors for those codes need multiple observations of the same discrete symbol, where each symbol contains at most 4.39 bits of information as in the MiniCode.

It is unclear if such a methodology can be generalized to include more information bits per symbol, while ensuring good decoding performance of different hierarchy of information using different sensor equipment. Furthermore, the prior arts visible codes cannot deal with motion blur that result when the sensor moves at high speed relatively to the mark, or when the sensor is at a large distance from the marks. Low resolution of the mark can also be a problem for the sensor.

In a completely unrelated field, cellular networks often use orthogonal frequency division multiplexing (OFDM) to encode data for transmission. OFDM is relatively easy to implement and can reduce the cost of frequency domain equalization. This makes OFDM advantageous over many competing technologies. OFDM coding in for optical carriers is also known, see U.S. Pat. No. 7,796,898.

SUMMARY OF THE INVENTION

Embodiments of the invention provide a method for coding information symbols using a continuous mapping function. Conventional symbols are usually coded using multiple discrete marks generated by a discrete mapping function. To the best of our knowledge, up to now, no coding scheme uses continuous marks and continuous mappings functions, such as obtained from orthogonal frequency division multiplexing (OFDM).

Specifically, a method physically marks an object by encoding each symbol of a set of symbols using a continuous mapping function to produce corresponding encoded functions, wherein values of the encoded functions are real and vary continuously. The encoded functions are summed in a spatial domain to generate a summed function. A bias function is added to the summed function to produce a biased function, wherein the values of the biased function are all positive. Then, a physical property of the object is altered according the biased function to arrange the mark on the object.

DETAILED DESCRIPTION OF THE PREFERRED EMBODIMENT

Figure 1A:
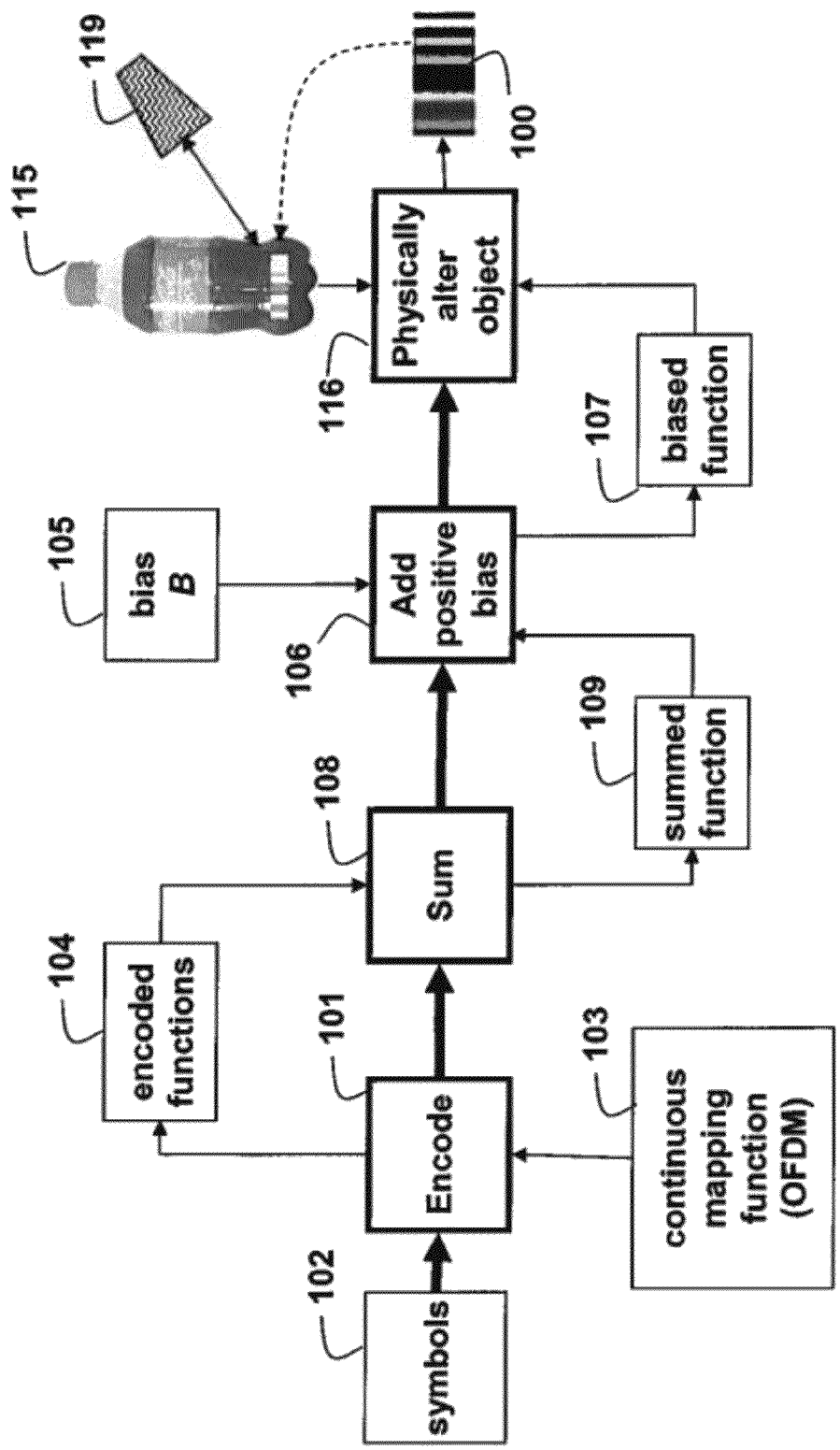
FIG. 1A is a flow diagram of a method for physically marking an object to encode symbols according to embodiments of the invention.

As shown in FIG. 1A, a method for visibly marking a physical object 115 encodes 101 each symbol of a set of symbols 102 using a continuous mapping function 103 to produce corresponding encoded functions 104, wherein values of the encoded functions are real and vary continuously.

One way to obtain the continuous mapping function is by Frequency Division Multiplexing (OFDM) coding. Other ways include Code Division Multiplexing (CDM), and Constant Amplitude Zero Autocorrelation (CAZAC).

Then, the encoded functions are summed 108 to produce a summed function 109. A positive bias function B 105 is added 106 to the summed function to produce a biased function 107. Then, a physical property of the object 115 is altered 116 according the biased function to mark the object with a mark 100. The mark can be printed or embossed, for example. The mark can be sensed, e.g., optically by a camera or a range scanner 119 and appropriately decode.

This invention applies the concept of object marking to one-dimensional (1D), two-dimensional (2D), and three-dimensional (3D) marks on objects. The marks alter the object physically.

For 3D marking, the method can be used for transparent or translucent 3D objects. In this case, the marks are sensed by a 3D sensing device. Instead of sensing the 3D objects from external positions, the sensor can be internal to the objects, e.g., inside a fluid or, and a spherical sensor acquires all 3D observations.

The OFDM encoding uses an Inverse Fast Fourier Transform (IFFT), and the corresponding decoding uses a Fast Fourier Transform (FFT). The dimensionality of the coding corresponds to the dimensionality of the IFFT and FFT operations that is used.

In communication systems, only 1D-IFFT and 1D-FFT are used. Operations of multidimensional IFFT and FFT have not been used in communication technology or for physically marking objects.

The embodiments of the invention first focus on 1D marking technology. The generalization to multidimensional marking is described as needed.

Figure 1B:
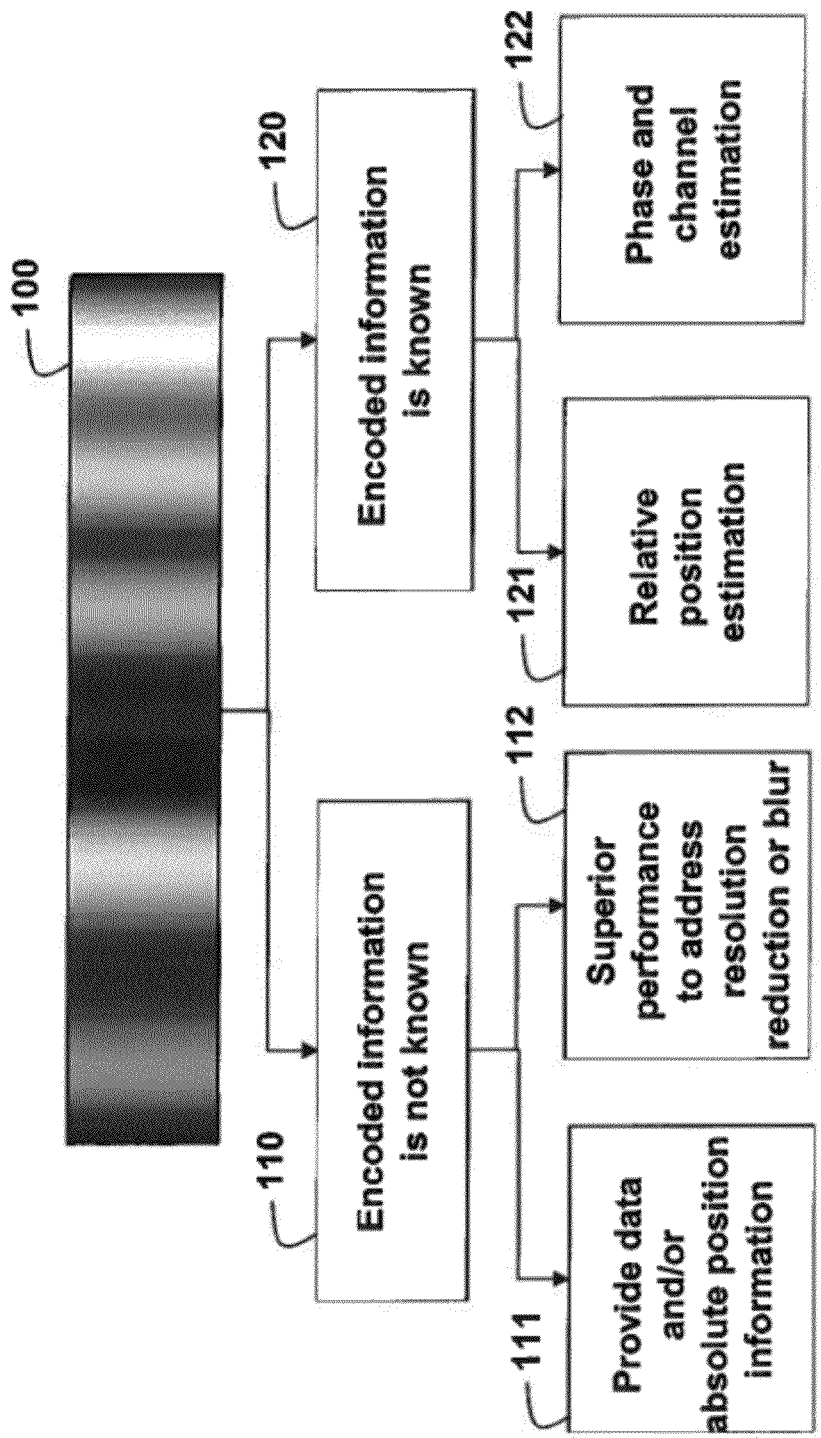
FIG. 1B is a schematic for OFDM optical markings when underlying information that is encoded in the mark in one case is known and in an other case is unknown.

FIG. 1B shows the example 1D mark 100. Clearly, an appearance structure of the mark is continuous, e.g., in intensity if the mark is visible This type of mark can be used to solve the following problems:

(1) When the underlying information that is encoded in the mark is unknown 110, the sensor decodes this information to provide absolute position information or other information for location-based services. The mark has superior performance to address resolution reduction, sensing at a distance, or motion blur 111.

(2) When the underlying information encoded in the mark is known 120, the sensor can use the observation to estimate a relative position to the mark 121, and perform phase and channel estimation 122, which is the estimation of the point spread function and other blurring or resolution reduction effects that are present in an image. In both problems, the unique properties of the continuous marks enable graceful performance degradation.

Underlying Information is Unknown

Figure 2:
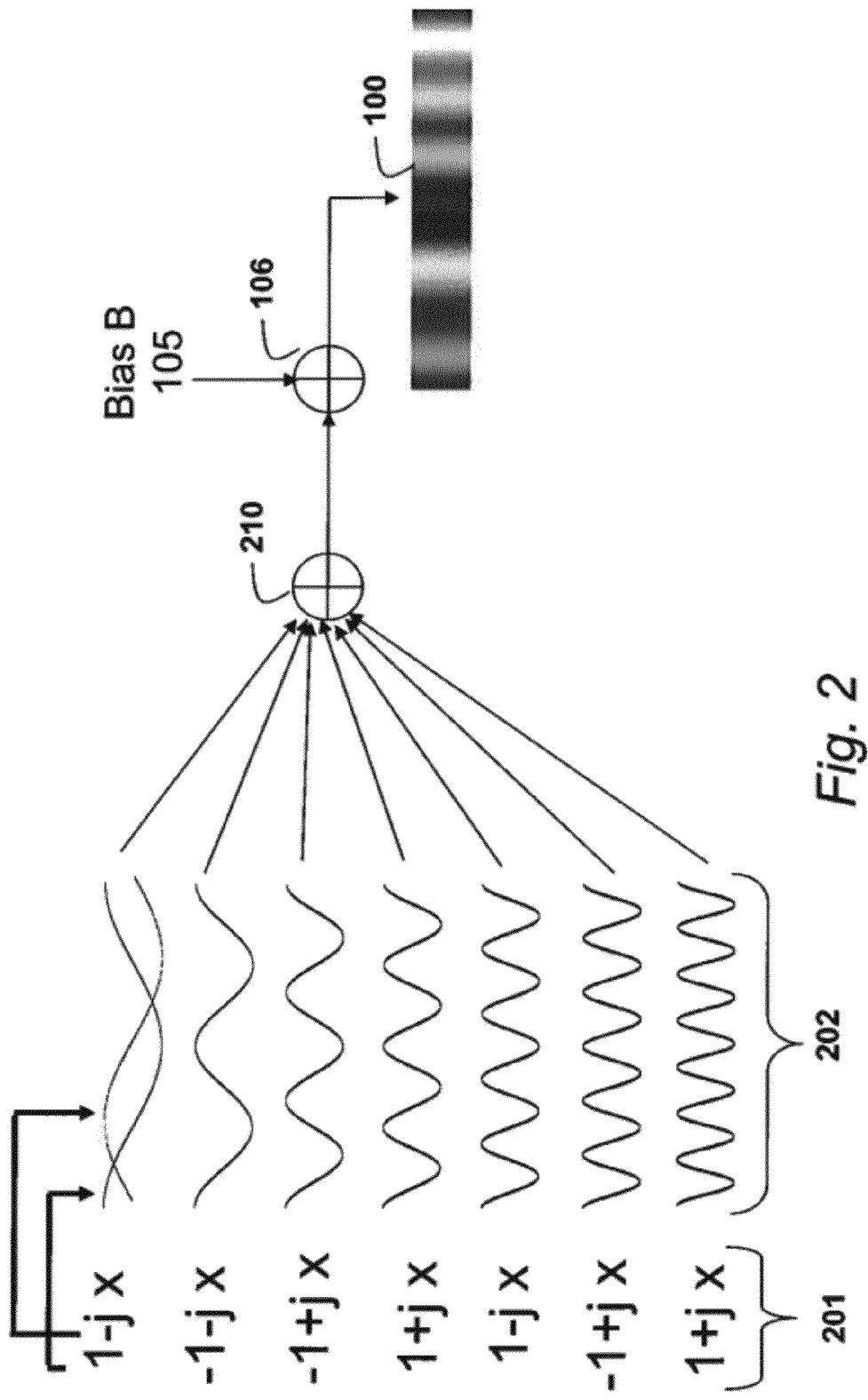
FIG. 2 is a schematic for encoding information onto OFDM marks using QPSK according to embodiments of the invention.

As shown in FIG. 2, to encode information into the OFDM mark 100 according to embodiments of the invention, consider an IFFT operation with N frequency tones. Each frequency tone can take on any complex constellation, e.g., Quadrature Phase Shift Keying (QPSK), or Quadrature Amplitude Modulation (QAM). For example, if QPSK is used, then each frequency tone takes on one of number of possible values 201: $\{1+j, -1+j, -1-j, 1-j\}$ where j is $\sqrt{-1}$. Each real and imaginary component of the frequency tone corresponds to a real, continuous function 202 in the spatial domain. The different tones map to a sinusoidal function, i.e., a mark that has a frequency as an integer multiple of a fundamental frequency.

With an N tone IFFT operation, only N−1 tones are used. The DC tone, corresponding to constant value in spatial domain, is not used. Unlike OFDM symbols used in coherent communication systems, here, negative values are not allowed, and the DC bias function is used to make all values of the encoded functions positive and real.

Hence, using QPSK, an N tone OFDM has 2(N−1) information symbols. Each 2(N−1) information symbol maps to a real, continuous function, and all 2(N−1) are summed 210 in the spatial domain to generate intensities for the summed function 109, which can be the values for the mark used to alter the physical properties of the object 115.

Figure 3:
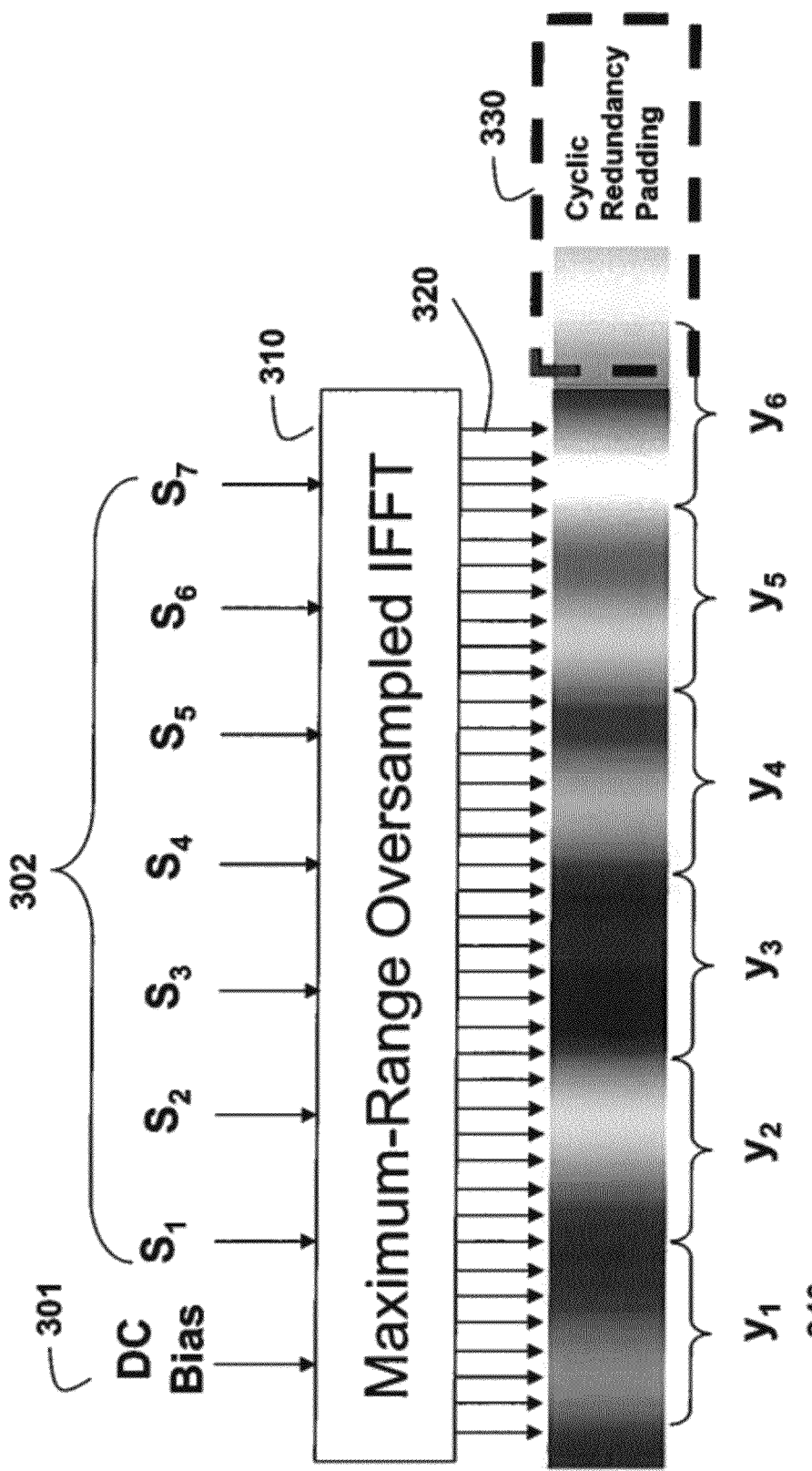
FIG. 3 is a schematic for encoding information using maximum-range oversampled inverse fast Fourier transforms according to embodiments of the invention.

As shown in FIG. 3, because optical intensities do not take on negative value, a positive DC bias function 301 is added symbols $s_i$ 302 to be encoded so that a minimal intensity is zero (black). Furthermore, after adding the DC offset, the intensity is scaled so that a maximum intensity corresponds to white. Intermediate values of the continuous function are mapped to grayscale intensities between black and white. The mapping to black and white can be reversed, or the mapping can be to other colors, without loss of generality.

To print the continuous function as an optical mark, the printing device generates the mark with a much higher resolution than needed for decoding. This encoding process is called a Maximum-Range Oversampled IFFT 310, which has a maximum dynamic range and pixel density.

After applying the Maximum-Range Oversampled IFFT process to the symbols to be encoded as real components 320, a portion of the mapping at one end of the mark is copied, and the portion is placed at an adjacent to the end edge of the mark to provide Cyclic Redundancy Padding(CRP) 330. This process is analogous to using a Cyclic Prefix in wireless OFDM transmission. A size of the padding can be selected depending on requirement of the application.

To decode the optical mark 310, the imaging device or scanner 119 acquires an image of the mark, and uses the sensed intensities $y_1, y_2, \ldots, y_{K_T}$ 340 to decode the mark, where $K_T$ is the number of sensed samples. The CRP can be used for correction. It should be noted that when the mark is in the form of a physical deformation of the surface of the object, the mark can be sensed by a 3D range scanner. It should be noted that the decoding is essentially the reverse operation of the encoding as described above.

It is important to note that even though the mark is printed at resolution much higher than required for reconstruction, the number of sensed samples can be very small. As a matter of fact, as shown in FIG. 3, an 8-tone OFDM symbol is used to encode seven symbols; but observations are made with only six samples. Information can still be decoded when the sensor has fewer samples than the number of information symbols encoded.

The sensor decodes the information, to obtain estimated symbols $\hat{s}_n$, using the following equation:

$$\hat{s}_n = \frac{1}{N}\sum_{k=1}^{K_T} y_k \exp\left(-j\frac{2\pi n}{N_T}P_k\right),$$

where N is a normalization factor, $N_T$ is the number of frequency tone in the OFDM symbol, and $P_k$ is an estimated position of the sample. For example, $N_T=8$, $K_T=6$, and $P_k$ is the position of $y_k$. Estimating the positions $P_k$ can be done using a number of techniques, including the use of a pilot sequence of OFDMs as described below.

Figure 4:
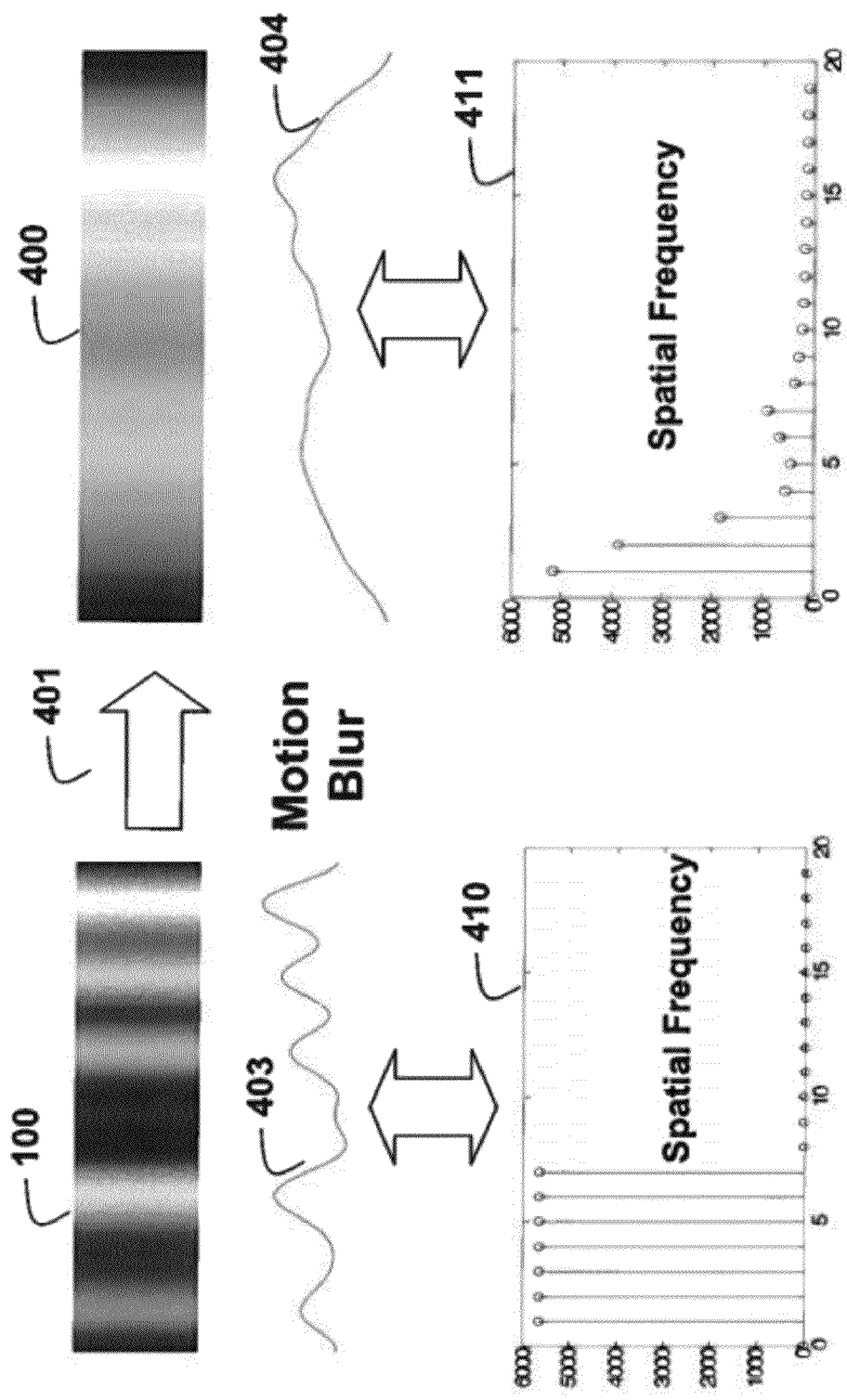
FIG. 4 is a schematic of a stationary OFDM mark and the corresponding mark under motion blur according to embodiments of the invention.

FIG. 4 shows the stationary OFDM mark 100 and the corresponding mark 400 under motion blur 401. The figure also shows the corresponding sensed optical signals 403-404 for these two cases. It should be noted that motion blur exists when an image of the mark is sensed with a camera. This type of motion blur is distinguished from conventional product IUPC) mark scanning with a laser, when the individual sensed samples are effectively stationary even though the product is moving when scanned. In a single image, the motion blur can be severely affect the appearance of the mark.

The marks according to embodiments of the invention have a number of unique properties and effects that are not present in prior art optical marks. For example, the marks preserve key information even under motion blur 401 when the sensor moves relative to the mark. From an optical signal processing perspective, all of these effects essentially take original frequency components 410 and attenuate particularly high frequency information 411 from the mark.

Figure 5:
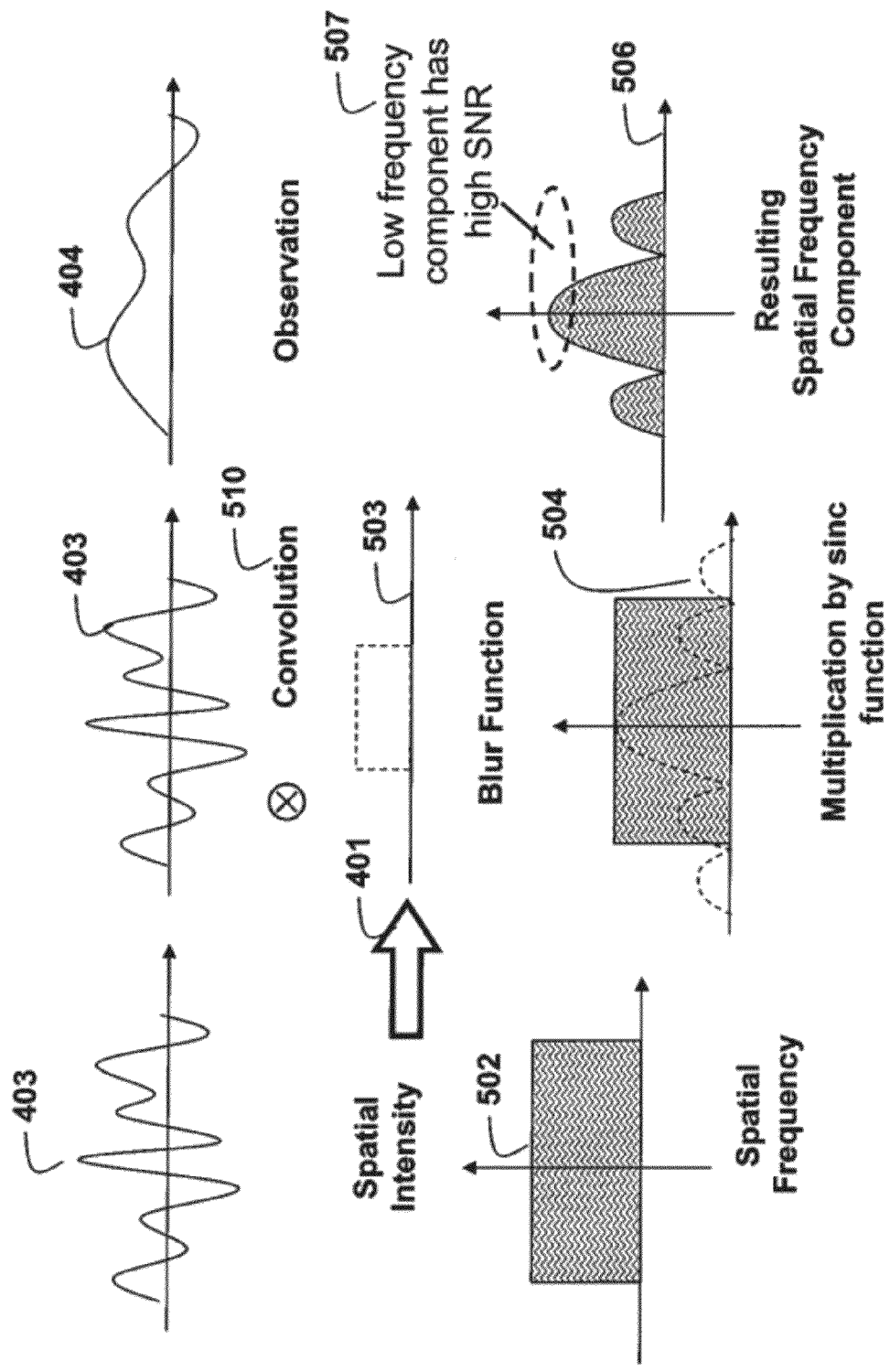
FIG. 5 is a schematic of the effect of motion blur on signal processing according to the embodiments of the invention.

FIG. 5 shows the effect of motion blur on the signal processing. The signal 403 contains a spatial frequency 502. Under motion blur, the signal 403 is convolved 510 with blur function 503 in the spatial domain. This is equivalent to multiplying the spatial frequency 502 by a sinc function 504 (dashed line). The resulting sensed signal 404 then has the spatial frequency 506, which clearly has high SNR at low frequency 507.

Figure 6:
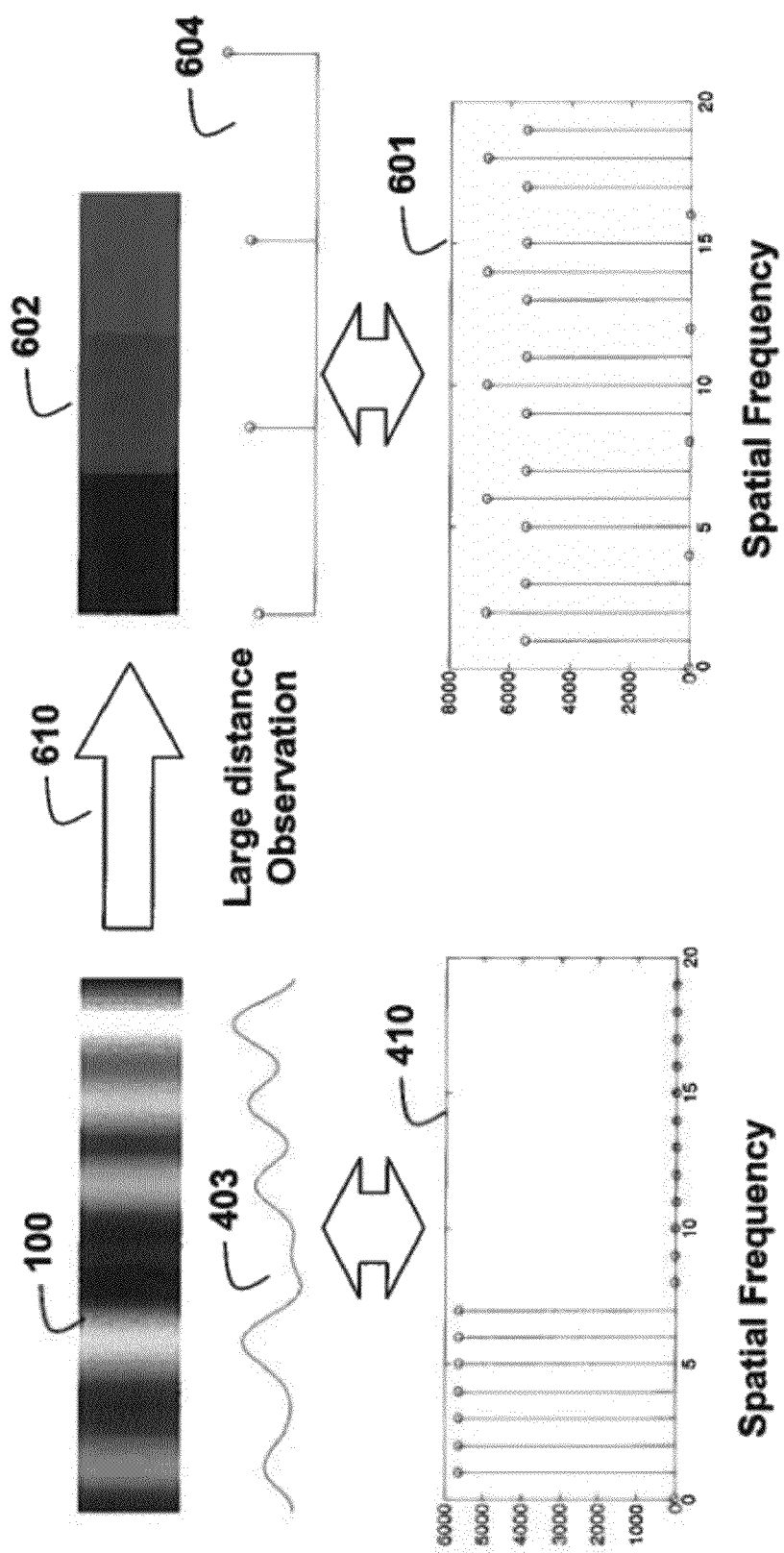
FIG. 6 is a schematic of the effect of sensing marks at a large distance on signal processing according to the embodiments of the invention.

FIG. 6 shows the stationary OFDM mark 100 and the corresponding mark 603 when the mark is sensed from a large distance 610. The figure also shows the sensed optical signals 403 and 604 for these two cases. The marks according to embodiments of the invention have a number of unique properties and effects that are not present in prior art discrete optical marks. Sensed samples can be acquired by a low cost camera, a single moving optical sensor, or a linear arrangement of a small number of sensors with a reduced linear resolution. In addition, samples can be acquired at a large distance from the marks.

From an optical signal processing perspective, all of these effects essentially take original frequency components 410 and attenuate particularly high frequency information 601 from the mark, and aliasing results due to an equivalent of a down-sampling operation when the resolution is reduced.

Figure 7:
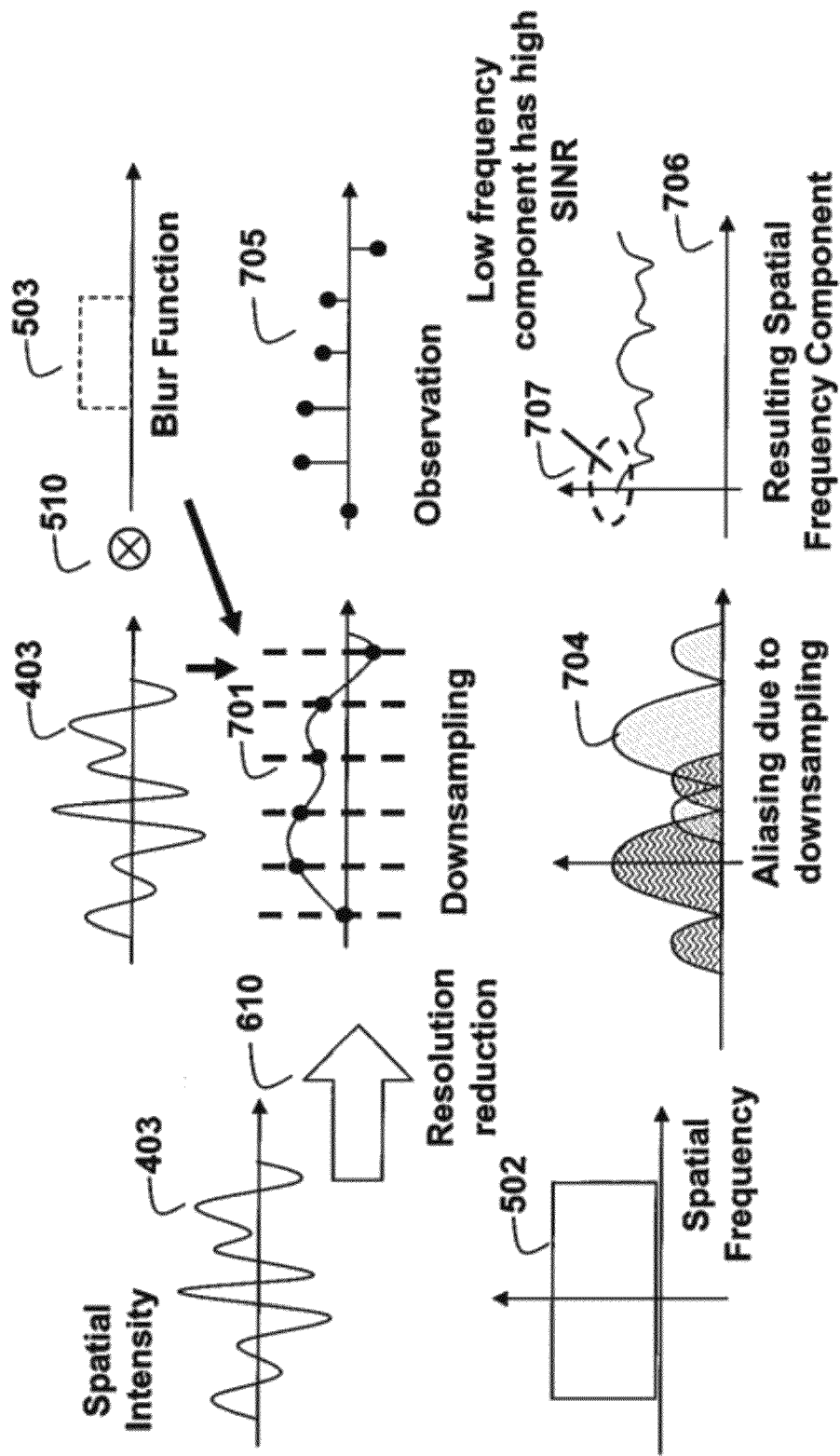
FIG. 7 is a schematic of the effect of sensing reduced resolution marks on signal processing according to the embodiments of the invention.

FIG. 7 shows further details on a signal processing perspective on resolution reduction. Signal 403 contains spatial frequency 502. Under resolution reduction 610, the signal 403 is convolved 510 with blur function 503 in spatial domain, and the signal then undergoes downsampling 701 to result in sensed signal 705. This is equivalent to multiplying the spatial frequency 502 by a sinc function, and then aliasing causes a repetition of the frequency components at a higher frequency 704. The resulting sensed samples 705 then has spatial frequency 706, which clearly has high SINR at low frequency 707.

It is also important to note that, in all these cases, the low frequency tones of the OFDM mark retain high signal-to-interference-plus-noise ratio (SINR). Thus, the mark can be decoded even under non-ideal condition. In effect continuous (OFDM) marks enable hierarchical, graceful degradation of performance.

Figure 8:
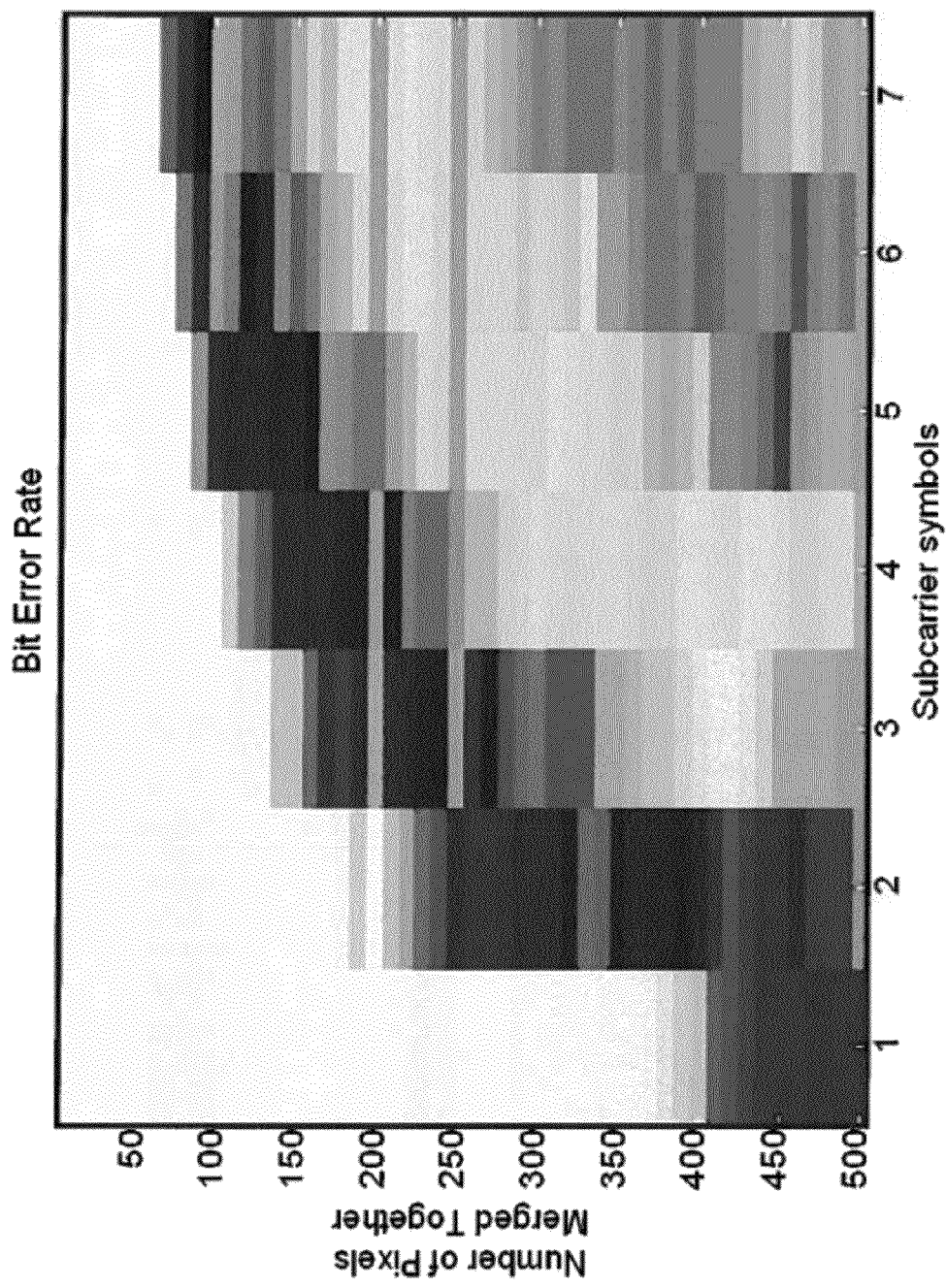
FIG. 8 is a schematic of a bit error rate performance for an OFDM mark according to embodiments of the invention.

FIG. 8 shows the bit error rate performance for an OFDM mark with a FFT Size=8, and 14 bits printed on 1000 pixels. The figure shows the bit error rate (gray scale intensity) as a function of the number of merged bits and carrier symbols decoded. At a high SNR, all data are decoded successfully when the sensor sensed at least 17 samples. Each information bit requires 1.22 pixels of observations. As the resolution decreases, some information can still be decoded. Graceful degradation is achieved, e.g., four bits of information can be decoded with only seven observation pixels.

Figure 9:
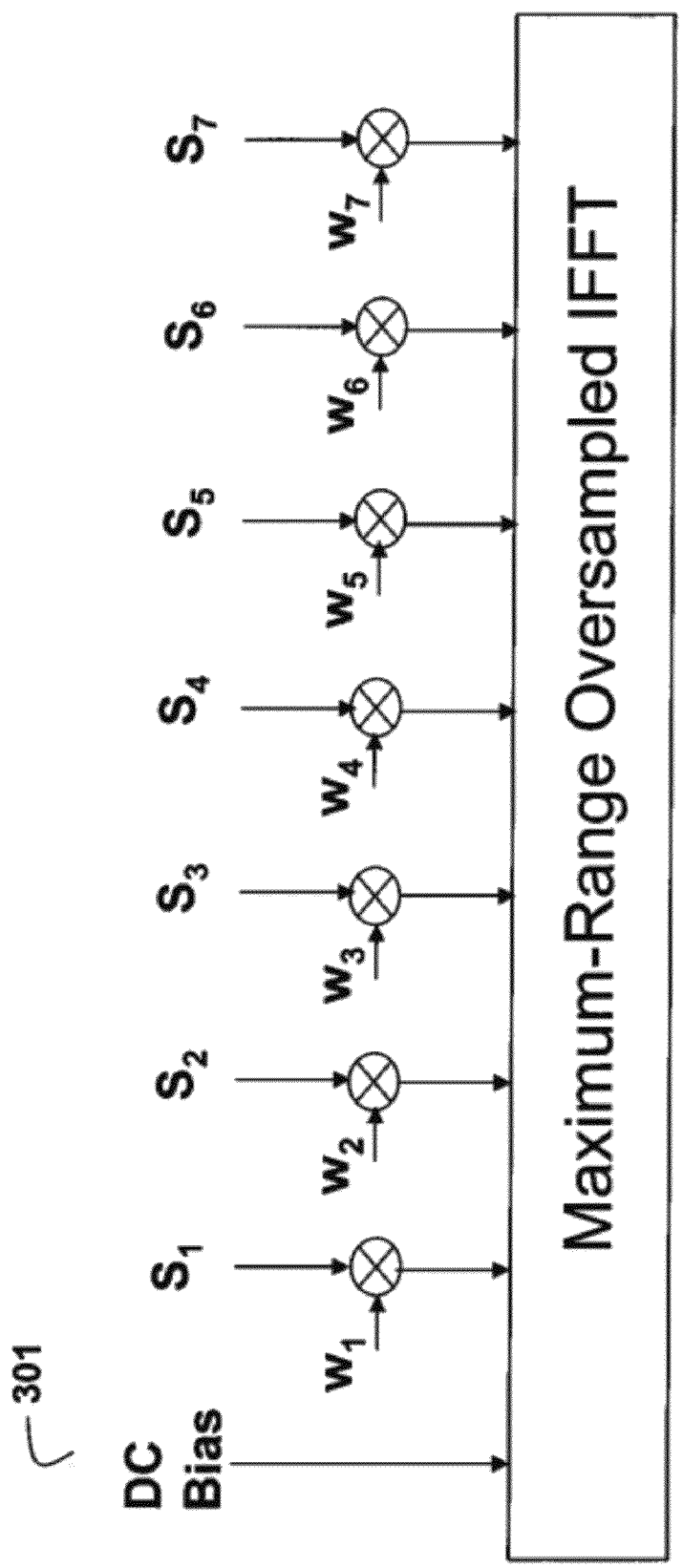
FIG. 9 is a schematic of spectrum shaping to control aliasing in the marks according to embodiments of the invention.

FIG. 9 shows an application of spectrum shaping to minimize aliasing in the continuous marks. A real-valued monotonically non-increasing weighting function ($w_n$) can be applied to the sub-carrier symbols $s_n$. This reduces aliasing effect on low frequency components. This trades off the performance of information encoded in different frequency components. The spectrum shaping multiplies each symbol by a constant real value to affect the performance of each OFDM "tone."

Figure 10:
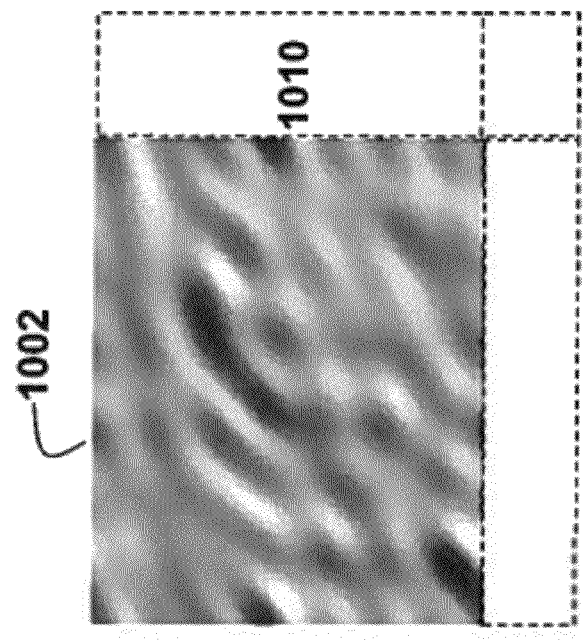
FIG. 10 are images of 2D-OFDM marks for stationary and moving marks.
Figure 10:
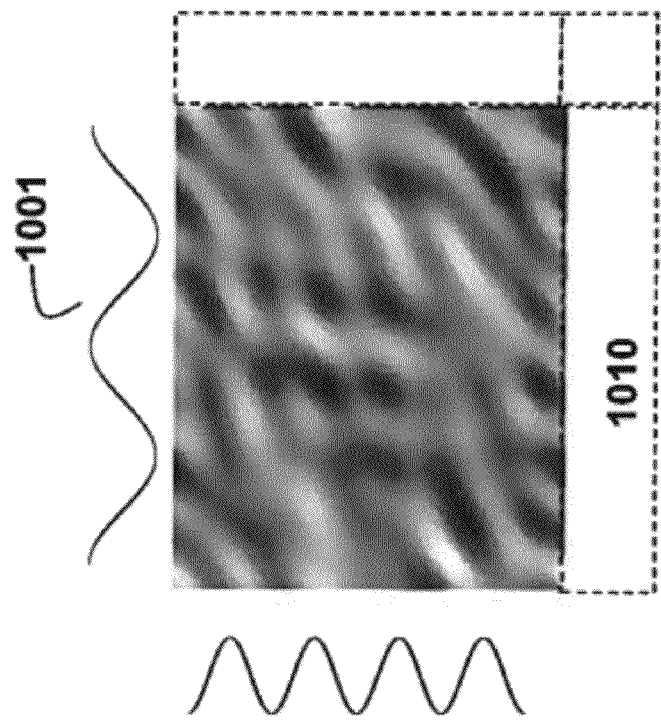

FIG. 10 show 2D-OFDM mark for stationary mark, and the corresponding image acquired when the mark is moving 1002. In this case, a 2D-IFFT is used. No data are encoded over the DC tone. Hence, for N×N-tone OFDM marking, $N^2-1$ tones are used to encode data. With QPSK modulation, such marks supports $2(N^21)$ information symbols. Similar to 1D marking, the 2D mark is printed at high resolution, and cyclic redundancy padding 1010 can be is used to repeat portion of the mark at two edges 1010.

Underlying Information is Known

When the underlying information is known, the tones are known "pilot tones." This is a term borrowed from telecommunications. In telecommunications, a pilot is a signal, usually a single frequency, transmitted over a communications system for supervisory, control, equalization, continuity, synchronization, channel sounding or reference purposes. In our case, the marks with pilot tones can provide relative position information, as well as means for phase and channel estimation.

The pilot tones in the OFDM mark are $s_1, s_2, \ldots, s_{N_T-1}$ see FIG. 3. The sensed values are $y_1, y_2, \ldots y_{K_T}$. The relative position information $P_k$ can be determined by $$s_n = \frac{1}{N}\sum_{k=1}^{K_T} y_k \exp\left(-j\frac{2\pi n}{N_T}P_k\right)$$

for each $S_n$. In addition, for many applications it is known that $$P_{k+1}-P_k=P_{j+1}-P_j=D.$$

Hence, the above provides $N_T-1$ equations and two unknowns, i.e., first position offset $P_1$, and the gap D. Furthermore, in some situations, D is known and the sensor only need to solve for one unknown.

Figure 11:
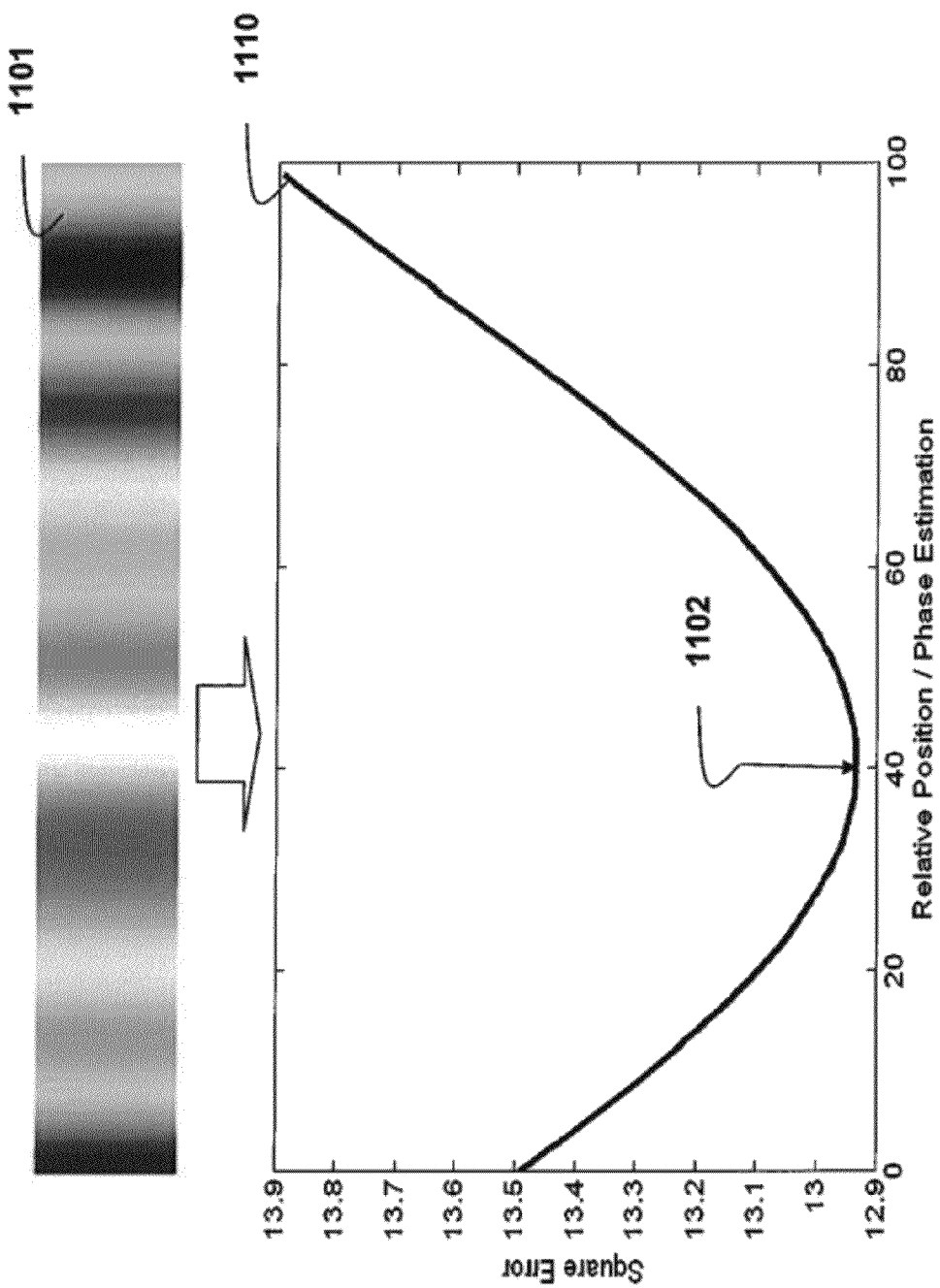
FIG. 11 is a schematic of obtaining position information from marks with pilot tones according to embodiments of the invention.

FIG. 11 shows the above described process for estimating the phase or position. A training sequence of pilot tones [−1+j 1+j 1+j−1+j 1−j 1−j−1−j] is used to generate the mark 1101. $P_{k+1}-P_k$ is known, the bias is 40, with a high SNR. If $P_{k+1}-P_k$ is not known, the observation can still estimate 3D relative positions. The corresponding graph 1100 shows the relative position/phase 1102 as a function of a least square error. That is, a Maximum-Likelihood (ML) estimation using least square error method can be used to estimate the first position offset 1102 when the gap D is known.

In general, the gap D can be used to determine the distance from the mark to the sensor. Hence, with 2D OFDM mark, it is possible to perform 3-dimensional position estimations.

For observations subject to noise, position estimation can result in an error. Generally, the OFDM mark that has a high variance in the mark intensity value performs better. The variance is determined directly from considering the variance of the real, continuous intensity function after the IFFT operation. Hence, given all possible OFDM sequences, the sequence that generate the largest intensity variance can be used for phase or position estimation. If other sequences are needed, sequences with large intensity variance are selected first.

Continuous Encoding Beyond OFDM

While the invention so far shows encoding marks using OFDM to generate continuous encoding functions, continuous mark can be generated using other model, such as that is used in Code Division Multiplexing (CDM) technology. The mark intensity x(z) at location z, for any real value z, can be encoded using $$x(z) = \sum_{n=1}^{N_T} s_n c_n(z) + B,$$

where $S_n$ is the information bit to be encoded, $c_n(z)$ is a continuous encoding function, and B is the bias. In OFDM, $c_n(z)$ are set to be sinusoidal functions so that $<c_n(z), c_m(z)>=0$ for any $n \neq m$, where $<.,.>$ is the inner product. In CDM, $c_n(z)$ can be selected to be functions so that $|<c_n(z), c_m(Z)>|<a$ for any $n \neq m$, where $|.|$ is the absolute function, and $a$ is a predetermined constant. Note that in generating $x(z)$, different continuous encoding functions are summed together. Constant Amplitude Zero Autocorrelation (CAZAC) can also be used. In the case of CAZAC sequences, the selected functions have the property that their autocorrelations are identically zero, $|<s_n, s_m>|=0$, when $n \neq m$. This property is useful in the design of pilot signals as the lack of sidelobes in the autcorrelation can improve channel estimation accuracy. The general form of the encoded mark can be written as above, with $s_n$ being a length $N_T$ CAZAC sequence.

In general, $c_n(Z)$ can contain negative values. Therefore, the bias function B is added to ensure that $x(z)$ is positive for all z.

Applications

Figure 12:
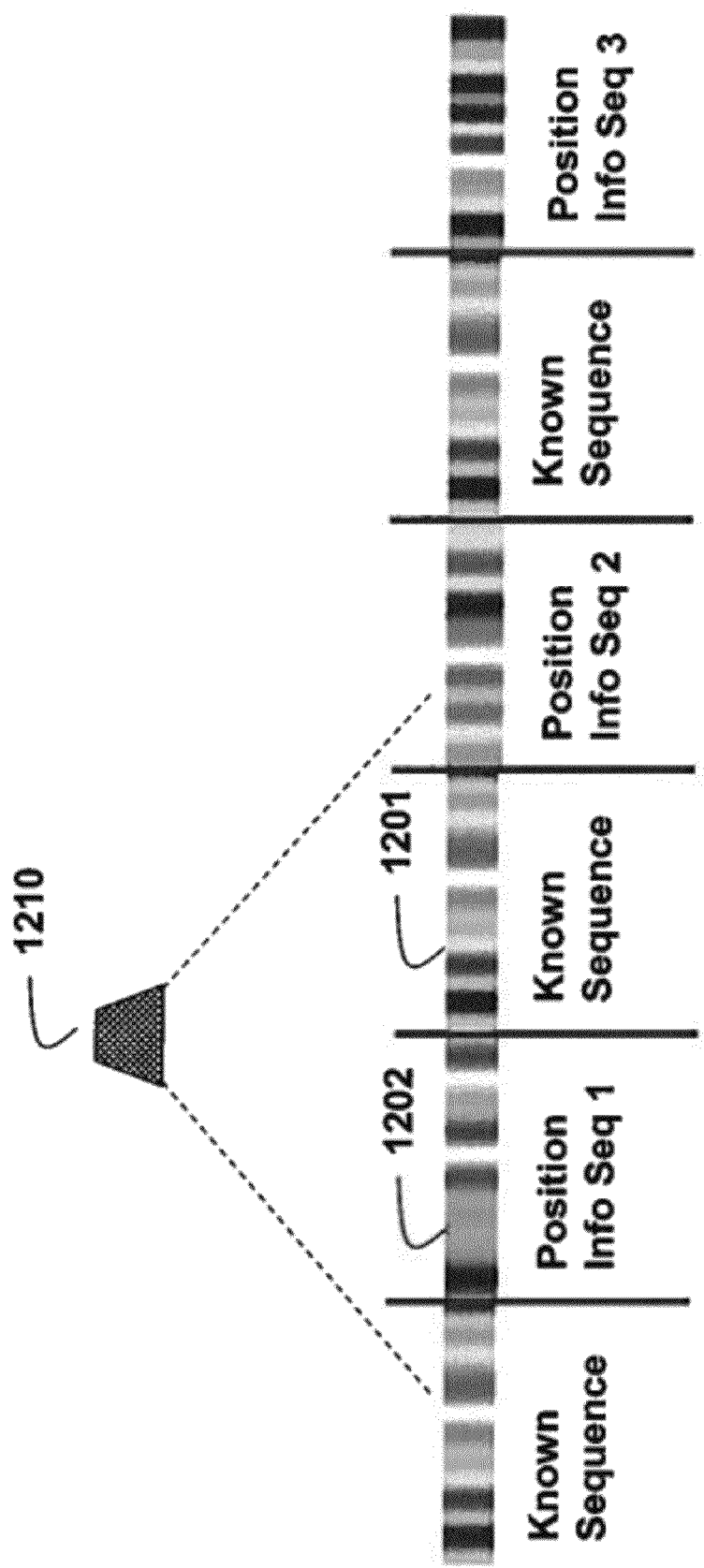
FIG. 12 is a schematic of using continuous marks with known sequences of pilot tones and adjacent unknown sequences to provide global and relative positioning information.

FIG. 12 shows how a known sequence of pilot tones and an unknown sequence can be adjacent to each other to provide global and relative positioning information to an sensing device such as a camera on a robotic arm. In this example, the camera 1210 field of view covers at least 2.5 contiguous sequences. The unknown sequences 1202 and known sequences 1201 are interleaved. The following procedure can be used to decode position information:

1. Use the known sequence for phase estimation, for decoding position information;
2. Phase estimation also gives relative positioning information; and
3. Decode the position information sequence for global positioning.

If the sequences with the high intensity variances are used the error can be minimized.

Figure 13:
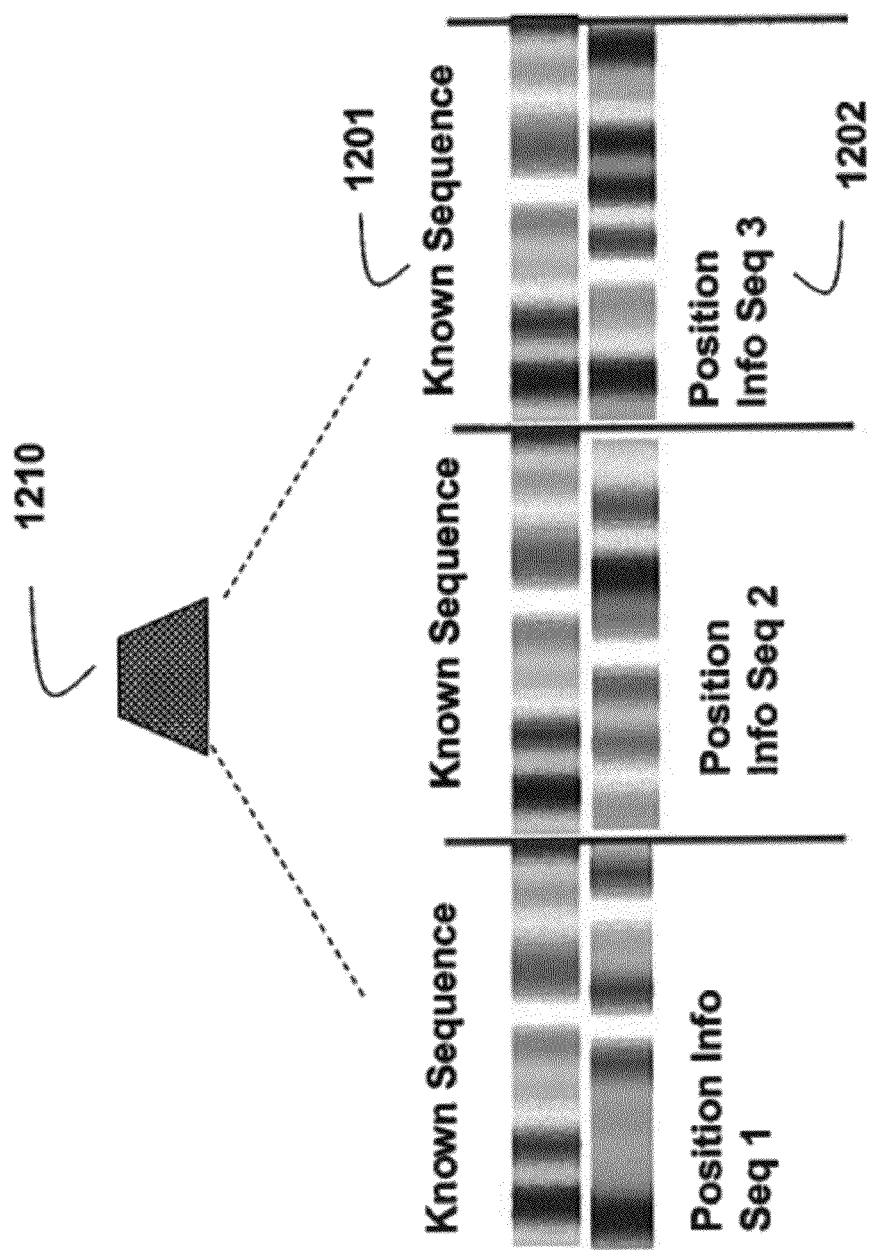
FIG. 13 is a schematic of using staggered continuous marks with known sequences of pilot tones and adjacent unknown sequences to provide global and relative positioning information.
Figure 14:
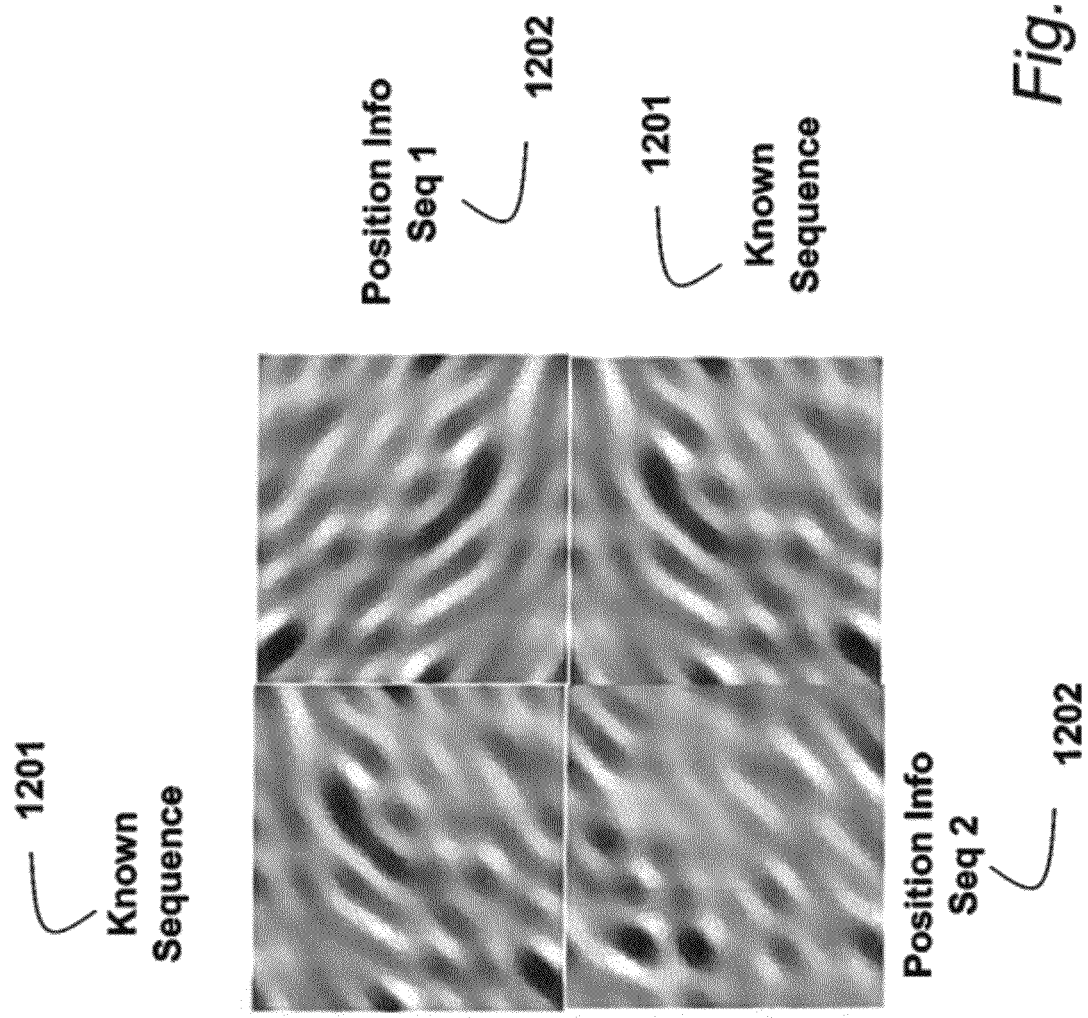
FIG. 14 is a schematic of using 2D continuous marks with known sequences of pilot tones and adjacent unknown sequences to provide global and relative positioning information.

FIG. 13 shows a variant with 1D staggered positions where the camera covers at least 1.5 sequences. The known 1201 and unknown 1202 sequence can also be located side-by-side as shown in FIG. 14 for a 2D mark.

When a camera or robotic arm is in motion or far away from the object, a part of the encoded information in the mark, such as position information, can be decoded. When the device either gets closer to the mark, or when the speed is reduced speed, more information can be decoded.

It should be noted that the marking can utilize other physical properties of the object, and does not necessarily be printed. For example the mark can be embossed, etched, stamped, or a deformation of the surface, e.g., continuous micro-grooves. These marking techniques can be used on hard surfaces where wear and tear might otherwise degrade a printed mark, or the surface of the object is not amenable to printing. The mark can be a "micro-dot" coding with a continuous wavy pattern that is not readily visible to the naked eye. Deformation or embossed marks can also be used on objects that are exposed to a harsh environment, where the printing might otherwise wash off. The essential part is that the marks alter the continuously physical properties of the object in such a way that the marks can still be sensed.

EFFECT OF THE INVENTION

The continuous marks according to embodiments of the invention have a number of improved characteristics not present in convention discrete marks such as bar codes. The mark can correct for motion blur. Hence, the marks can be placed on vehicles, such as cars, trucks, busses and trains. Marks can be read while the vehicles are moving through a toll booth, or along a train track.

The marks can be acquired by a low cost camera. For example, a single photo sensor can scan a moving mark, instead of complex laser scanners as are used for reading UPS codes. The marks can be read reliably from relatively large distances under high noise conditions.

The marks as described herein can be used for marking products, and documents, e.g., driver's licenses, boarding passes, medical identification, and passports. The marks can also be used for location based services, product price comparison, advertisement, shipment tracking, augmented reality applications, absolute and relative positioning.

The marking technology can be applied to many applications such as location-based services, geo-positioning, shipment tracking, thing-link, augmented reality and positioning in robotic and factory automation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for marking for an object, comprising the steps of:
    encoding each symbol of a set of symbols using a mapping function to produce corresponding encoded functions, wherein the mapping function is continuous and values of the encoded functions are real and vary continuously;
    summing the encoded functions in a spatial domain to generate a summed function;
    adding a bias to the summed function to produce a biased function, wherein the values of the biased function are all positive and real; and
    altering a physical property of the object according the biased function to arrange a mark on the object.

2. The method of claim 1, wherein the mapping function is generated using Frequency Division Multiplexing (OFDM) coding.

3. The method of claim 1, wherein the mapping function is generated using Constant Amplitude Zero Autocorrelation (CAZAC).

4. The method of claim 1, wherein the mark is printed.

5. The method of claim 1, wherein the mark is embossed.

6. The method of claim 1, wherein the mark is etched.

7. The method of claim 1, wherein the mark is stamped.

8. The method of claim 1, wherein the mark is embossed.

9. The method of claim 1, wherein the mark is a continuous deformation of a surface of the object.

10. The method of claim 1, further comprising:
    sensing the mark; and
    decoding the sensed mark to recover the set of symbols.

11. The method of claim 10, wherein the sensing is performed by a camera.

12. The method of claim 10, wherein the sensing is performed by a scanner.

13. The method of claim 10, wherein the sensing is performed by a range scanner.

14. The method of claim 1, wherein the mark is one-dimensional.

15. The method of claim 1, wherein the mark is two-dimensional.

16. The method of claim 1, wherein the mark is three-dimensional.

17. The method of claim 1, wherein the mapping function uses
Frequency Division Multiplexing (OFDM) coding and an Inverse Fast Fourier Transform (IFFT), and the mark is decoded using a Fast Fourier Transform (FFT).

18. The method of claim 17, wherein the IFFT is a Maximum-Range Oversampled IFFT.

19. The method of claim 17, wherein the IFFT uses a plurality of frequency tones selected from a complex constellation.

20. The method of claim 19, wherein the complex constellation uses Quadrature Phase Shift Keying (QPSK).

21. The method of claim 19, wherein the complex constellation uses Quadrature Amplitude Modulation (QAM).

22. The method of claim 19, wherein low frequency tones retain a high signal-to-interference-plus-noise ratio (SINR).

23. The method of claim 1, wherein the mark is multi-dimensional.

24. The method of claim 1, wherein the set of symbols is unknown, and sensing the mark provides absolute position information.

25. The method of claim 1, wherein a portion of the mark is copied and arranged at an adjacent end edge of the mark to provide Cyclic Redundancy Padding(CRP).

26. The method of claim 1, wherein the mark is sensed from a large distance, and an appearance of the mark has a low resolution.

27. The method of claim 1, wherein spectrum shaping minimizes aliasing of the marks.

28. The method of claim 27, wherein the spectrum shaping uses a real-valued monotonically non-increasing weighting function.

29. The method of claim 1, wherein the mark is sensed by a sensor mounted on a robotic arm.

30. The method of claim 1, wherein the mark is used for location-based services.

31. The method of claim 1, wherein the mark is used for geo-positioning.

32. The method of claim 1, wherein the mark is used for factory automation.

33. The method of claim 1, wherein the mapping function is generated using Code Division Multiplexing (CDM) coding.

34. The method of claim 1, wherein the set of symbols is unknown, and sensing the mark provides relative position information.

35. A system for marking for an object, comprising:
means for encoding each symbol of a set of symbols using a mapping function to produce corresponding encoded functions, wherein the mapping function is continuous and values of the encoded functions are real and vary continuously;
means for summing the encoded functions in a spatial domain to generate a summed function;
means for adding a bias to the summed function to produce a biased function, wherein the values of the biased function are all positive and real; and
means for altering a physical property of the object according the biased function to arrange a mark on the object.

36. A method for marking for an object, comprising:
encoding a set of symbols using a mapping function to produce corresponding encoded functions, wherein the mapping function is continuous and values of the encoded functions are real and vary continuously;
summing the encoded functions in a spatial domain to generate a summed function;
biasing the summed function to produce a biased function, wherein the values of the biased function are all positive and real; and
altering a physical property of the object according the biased function to arrange a mark on the object.

* * * * *